US010152108B2

(12) United States Patent
Miura et al.

(10) Patent No.: US 10,152,108 B2
(45) Date of Patent: Dec. 11, 2018

(54) MOBILE APPARATUS AND POWER FEED CONTROL METHOD FOR MOBILE APPARATUS

(71) Applicant: OLYMPUS CORPORATION, Hachioji-shi, Tokyo (JP)

(72) Inventors: Hiroaki Miura, Hachioji (JP); Kenta Yumoto, Hachioji (JP); Masatoshi Tobinai, Inagi (JP); Ko Kimura, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 162 days.

(21) Appl. No.: 15/284,180

(22) Filed: Oct. 3, 2016

(65) Prior Publication Data

US 2017/0097669 A1 Apr. 6, 2017

(30) Foreign Application Priority Data

Oct. 5, 2015 (JP) .................................. 2015-197777

(51) Int. Cl.
*G06F 1/00* (2006.01)
*G06F 1/32* (2006.01)
*G06F 1/16* (2006.01)
(52) U.S. Cl.
CPC .......... *G06F 1/3206* (2013.01); *G06F 1/1694* (2013.01); *G06F 1/3215* (2013.01); *G06F 1/3231* (2013.01); *G06F 1/3287* (2013.01); *G06F 1/3296* (2013.01); *Y02D 10/171* (2018.01); *Y02D 10/173* (2018.01)

(58) Field of Classification Search
None
See application file for complete search history.

(56) References Cited

U.S. PATENT DOCUMENTS

| 5,953,677 A * | 9/1999 | Sato .................. H04W 52/0254 |
| | | 455/574 |
| 2010/0033424 A1* | 2/2010 | Kabasawa .............. G01C 17/28 |
| | | 345/156 |
| 2011/0074945 A1* | 3/2011 | Watanabe .............. H04N 5/232 |
| | | 348/81 |

(Continued)

FOREIGN PATENT DOCUMENTS

JP 2011-087168 A 4/2011

*Primary Examiner* — Nitin C Patel
(74) *Attorney, Agent, or Firm* — Volpe and Koenig, P.C.

(57) ABSTRACT

A mobile apparatus that can surely execute desired actuation and devises control of actuation to realize power saving and a power feed control method for the mobile apparatus are provided. Therefore, a mobile apparatus of the present invention includes an acceleration detecting section configured to detect acceleration, a state identifying section configured to identify switch operation, and a power-feed control section configured to perform power feed control. The power-feed control section performs control to start power feed when the acceleration detecting section detects acceleration and continue the power feed when the state identifying section identifies the switch operation after the acceleration detecting section detects the acceleration and performs control to stop the power feed when the state identifying section does not identify the switch operation after the acceleration detecting section detects the acceleration.

15 Claims, 5 Drawing Sheets

(56) References Cited

U.S. PATENT DOCUMENTS

2012/0206414 A1* 8/2012 Tada ................ G06F 1/1643
  345/175
2012/0214595 A1* 8/2012 Kawamoto ............ A63F 13/06
  463/36

* cited by examiner

MOBILE APPARATUS AND POWER FEED CONTROL METHOD FOR MOBILE APPARATUS

CROSS REFERENCE TO RELATED APPLICATION

This application claims the benefit of Japanese Application No. 2015-197777 filed in Japan on Oct. 5, 2015, the contents of which are incorporated herein by this reference.

BACKGROUND OF THE INVENTION

1. Field of the Invention

The present invention relates to a mobile apparatus, which is a portable and small electronic apparatus, configured to be able to be freely carried by a user and easily usable in a place to where the mobile apparatus is carried, and, more particularly, to a power feed control technique that takes into account power saving.

2. Description of Related Art

As a mobile apparatus, which is a portable and small electronic apparatus, including a small housing to enable a user to freely carry the mobile apparatus and configured to be easily usable in a place to where the mobile apparatus is carried, for example, to be driven by a battery, various mobile apparatuses such as an image pickup apparatus (a digital camera, etc.) and a recording apparatus (a digital voice recorder) have been put to practical use and spread to the public.

In the mobile apparatus in the past, various ideas for acquiring easy operability have been devised. For example, a mobile apparatus disclosed by Japanese Patent Application Laid-Open Publication No. 2011-87168 includes an acceleration sensor configured to detect acceleration applied to the apparatus and a photointerrupter (a state identifying section) configured to identify a state of the apparatus. The portable apparatus performs control to start power feed to the apparatus when the acceleration sensor detects acceleration and the photointerrupter identifies a predetermined first state (e.g., a state in which a user performs a motion of lifting the apparatus placed on a desk) and, on the other hand, not to start the power feed to the apparatus when the acceleration sensor detects acceleration and the photointerrupter identifies a second state (e.g., a state in which the user is carrying the apparatus) other than the first state.

For example, in a configuration in which a state of the apparatus is detected by only the acceleration sensor, it is likely that the first state (the state of the lifting motion) of the apparatus and the second state (the carrying state) of the apparatus are erroneously detected. However, it is considered possible to prevent the erroneous detection if the configuration disclosed by the publication or the like is adopted, that is, if the portable apparatus is configured to be capable of identifying the first state and the second state with the acceleration sensor and the photointerrupter.

SUMMARY OF THE INVENTION

A mobile apparatus according to an aspect of the present invention includes: an acceleration detecting section configured to detect acceleration; a state identifying section configured to identify switch operation; and a power-feed control section configured to perform power feed control. The power-feed control section performs control to start power feed when the acceleration detecting section detects acceleration and continue the power feed when the state identifying section identifies the switch operation after the acceleration detecting section detects the acceleration and performs control to stop the power feed when the state identifying section does not identify the switch operation after the acceleration detecting section detects the acceleration.

A power feed control method for a mobile apparatus according to an aspect of the present invention includes: detecting acceleration; determining whether a detected acceleration value exceeds a first determination level value; identifying switch operation; starting power feed when the detected acceleration value exceeds a predetermined determination level value; performing control to continue the power feed when the switch operation is identified within a predetermined time period after the acceleration is detected; and performing control to stop the power feed when the switch operation is not identified within the predetermined time period after the acceleration is detected.

Benefits of these inventions will be further clarified from the following detailed explanation.

DETAILED DESCRIPTION OF THE PREFERRED EMBODIMENTS

The present invention is explained below with reference to embodiments shown in the figures. Respective drawings used in the following explanation are schematically shown. Respective constituent elements are sometimes shown with dimension relations, scales, and the like of respective members varied for each of components to show the respective constituent elements in recognizable sizes on the drawings. Therefore, the present invention is not limited to only the numbers of the components, shapes of the components, ratios of the sizes of the components, relative positional relations of the respective components, and the like described in the respective drawings.

First Embodiment

Figure 1:
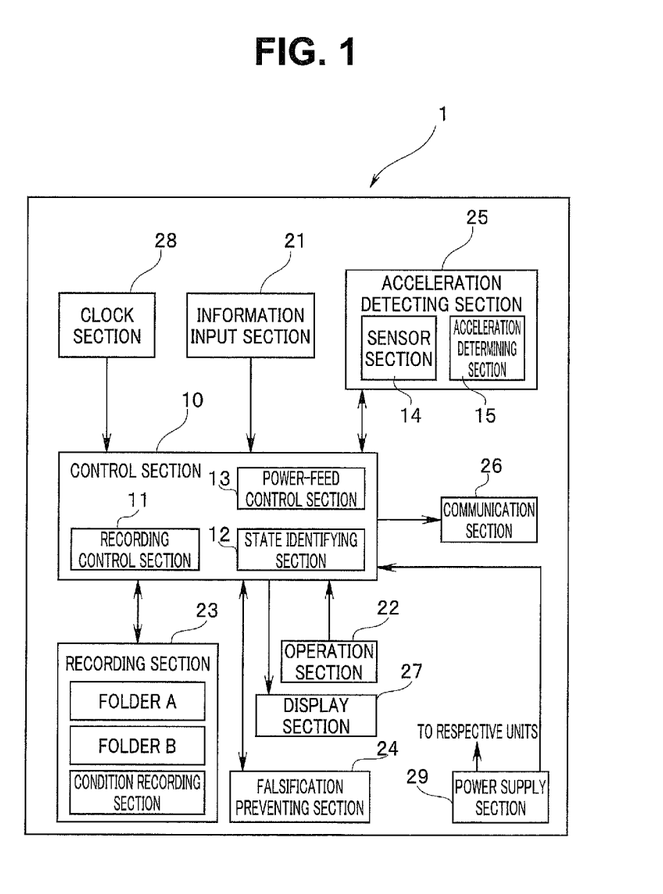
FIG. 1 is a block configuration diagram showing a configuration of a mobile apparatus in a first embodiment of the present invention.

FIG. 1 is a block configuration diagram showing a configuration of a mobile apparatus in a first embodiment of the present invention. In the present embodiment, as an example of a mobile apparatus applied with the present invention, a sound recording and reproducing apparatus (hereinafter abbreviated as recorder; an electronic apparatus so-called digital voice recorder or the like) is illustrated that is configured to be capable of converting, for example, sound information into digital data, recording the digital data including the sound data in, for example, an IC (integrated circuit) such as a flash memory, and reproducing sound on the basis of the recorded sound data.

As shown in FIG. 1, a recorder 1, which is the mobile apparatus in the present embodiment, includes components such as a control section 10, an information input section 21, an operation section 22, a recording section 23, a falsification preventing section 24, an acceleration detecting section 25, a communication section 26, a display section 27, a clock section 28, and a power supply section 29.

The control section 10 is a circuit section that collectively controls an entire electric circuit of the recorder 1. The control section 10 is configured to include, for example, a recording control section 11, a state identifying section 12, and a power-feed control section 13. This places importance on universality in order to assume various use scenes and perform accurate control taking into account operation and situations easily understood by a user. Therefore, the control section is often controlled by a computer program.

The recording control section 11 is a circuit section configured to control the recording section 23. More specifically, the recording control section 11 performs, for example, data processing for storing acquired sound data or the like in a predetermined storage region (a plurality of folders, etc.) of the recording section 23 and processing for reading out program data, data concerning various setting conditions, and the like recorded in advance in a condition recording section of the recording section 23.

The state identifying section 12 is a circuit section that identifies a state of switch operation. The switch operation indicates operation by a user on a plurality of operation members provided in the recorder 1. The state identifying section 12 identifies a state of switch operation of the operation member operated according to an instruction signal received from the operation section 22. A switch can be configured by a touch panel or the like. However, by configuring the switch as a mechanical switch, it is possible to consume an electric current only when operation is performed and improve energy saving performance by designing the switch to input an interrupt signal to the control section. That is, the switch can be designed to nearly eliminate energy consumption unless the user does not operate the switch.

More specifically, for example, it is assumed that a predetermined operation member among the plurality of operation members provided in the recorder 1, for example, an operation member for recording start (hereinafter referred to as recording button) is operated by a user. The recording button is associated with a recording on/off switch among a plurality of operation switches included in the operation section 22 inside the recorder 1. Therefore, when the recording button is operated, the recording on/off switch is switched from an OFF state to an ON state. That is, an instruction signal for changing a recording actuation to the ON state is generated. Receiving the recording actuation ON signal, the state identifying section 12 confirms that switch operation of the recording button is performed and identifies that the recording on/off switch is in a recording ON state. A result of the identification is outputted to the power-feed control section 13.

The power-feed control section 13 is a circuit section for performing power feed control or start control for receiving power supply from the power supply section 29, performing power feed of a predetermined amount at predetermined timing to an operating section that performs a predetermined operation respective constituent units on the inside of the recorder 1, and starting the power feed target constituent unit (the operating section). That is, the power-feed control section 13 may be reworded as a start control section for a predetermined constituent unit (the operating section) (referred to as power-feed control section in the following explanation and on the drawings).

In the recorder 1 in the present embodiment, the power-feed control section 13 performs power feed control and start control explained below. That is, the power-feed control section 13 starts power feed and starts the respective constituent units (operating sections) when the acceleration detecting section 25 detects acceleration. The power-feed control section 13 performs control for continuing the power feed when the state identifying section 12 identifies switch operation within a predetermined time period (see sign T1 shown in FIGS. 2 and 3) after the acceleration detecting section 25 detects acceleration. On the other hand, the power-feed control section 13 performs control for stopping the power feed when the state identifying section 12 does not identify switch operation within a predetermined time period (see sign T1 shown in FIGS. 2 and 3) after the acceleration detecting section 25 detects the acceleration.

As explained above, in the recorder 1 in the present embodiment, when the acceleration detecting section 25 detects acceleration, power feed to the respective constituent units (operating sections) by the power-feed control section 13 is started, whereby the respective constituent units (operating sections) start. For this purpose, at least the acceleration detecting section 25 and the power-feed control section 13 are desirably always started. Therefore, in the recorder 1 in this embodiment, the acceleration detecting section 25 and the power-feed control section 13 are not included in the operating sections. That is, among the internal constituent units of the recorder 1, the constituent units other than the acceleration detecting section 25 and the power-feed control section 13, for example, the respective constituent units such as the recording control section 11, the state identifying section 12, the information input section 21, the operation section 22, the recording section 23, the falsification preventing section 24, and the communication section 26 in the control section 10 correspond to the operating sections in the recorder 1. Note that details of the power feed control and the start control of the recorder 1 in the present embodiment are explained below.

The control section 10 has a function of receiving a sound signal (an analog signal) acquired by the information input section 21, applying, for example, AD conversion (analog-digital conversion) to the sound signal to convert the sound signal into digital data, and applying various kinds of signal processing (e.g., recording data generation processing, reproduction data generation processing, and reproducing speed and tone interval changing processing during reproduction) to the sound signal as appropriate. Therefore, the control section 10 also functions as various data processing sections concerning inputted sound data. Further, the control section 10 includes a temporary memory (not shown in the figures) that temporarily stores the sound data. Note that, concerning other components in the control section 10, detailed explanation of the components is omitted assuming that the components are the same as the components applied to the recorder and the like in the past.

The information input section 21 is a constituent unit including a constituent member, a circuit section, and the like for inputting information. In the recorder 1 in the present embodiment, for example, a so-called microphone unit including a microphone, which is a constituent member for inputting sound information, and a circuit section including a function of converting the sound information collected by the microphone into an electric signal corresponds to a specific form of the information input section 21. The information input section 21 is electrically connected to the control section 10. Consequently, a sound signal acquired by the information input section 21 is digitally converted in the control section 10 as explained above and thereafter outputted to the temporary memory (not shown in the figures) in the control section 10 as sound data and temporarily stored in the temporary memory. Note that the temporary memory (not shown in the figures) may be provided in the control section 10 as described above. A flash memory or the like provided separately from the control section 10 may be used as the temporary memory.

The operation section 22 is a component configured by, for example, a plurality of operation members, a plurality of switch members respectively associated with the plurality of operation members, and a circuit section that causes the plurality of switch members to output predetermined instruction signals by operating. The operation section 22 is electrically connected to the control section 10.

The recording section 23 is a constituent unit configured to include a storage medium for storing various data such as acquired sound data and program data and various setting conditions and a circuit section that drives the storage medium. The recording section 23 includes a plurality of folders (see a folder A and a folder B shown in FIG. 1), which are regions where sound data and the like are mainly stored, and a condition recording section, which is a region where the program data, the data concerning the various setting conditions, and the like are mainly stored. The recording section 23 is controlled by the recording control section 11 of the control section 10. Therefore, the recording section 23 is electrically connected to the control section 10.

The falsification preventing section 24 is a processing circuit section configured to apply specific data processing to sound data generated and recorded in the recorder 1 and perform protection, falsification prevention, and the like of the sound data. For example, the falsification preventing section 24 functions as a circuit section that applies, to the recorded sound data, for example, specific data processing for enabling reproduction only in the recorder 1 that executes the recording and specific data processing for enabling reproduction only when dedicated application software is used. Therefore, the falsification preventing section 24 is electrically connected to the control section 10. Note that, naturally, the falsification preventing section 24 may perform data processing other than the illustrated processing, for example, encryption processing for data and conversion processing for a file format.

The acceleration detecting section 25 is a circuit section that detects acceleration generated by a motion applied to the recorder 1 by the user.

The circuit has a characteristic that the circuit exclusively performs only determination of acceleration and is designed to reduce consumed energy by two or more digits than the general-purpose control section 10 through a configuration and simplification of the circuit. An idea for reducing the consumed energy of the control section 10 as much as possible by leaving control related to acceleration to the circuit is explained below. Naturally, the exclusive circuit section is sometimes integrally configured in the control section 10.

Acceleration is applied to the recorder 1, for example, when the user holds and lifts the recorder 1 placed on a desk in using the recorder 1 and when the recorder 1 is swung when the user carries the recorder 1 while holding the recorder 1 in the hand or storing the recorder 1 in a bag, a pocket, or the like.

The acceleration detecting section 25 is a circuit section including, for example, a sensor section 14, which is detecting means, and an acceleration determining section 15. The sensor section 14 is a detector including an electronic element or the like for detecting acceleration. The acceleration determining section 15 is a circuit section that receives an output of the sensor section 14 and performs determination of a level of the output. In the acceleration determining section 15, for example, information concerning a plurality of determination level values set in advance is stored. The acceleration determining section 15 determines a detection result inputted from the sensor section 14 on the basis of the determination level value. The determination result is outputted to the power-feed control section 13 of the control section 10. Such a function can also be realized by the circuit configuration with the consumed energy reduced in a state in which current consumption is the smallest.

In the present embodiment, the acceleration determining section 15 has a function of receiving an identification result from the state identifying section 12 of the control section 10 and performing switching of the determination result values (details are explained below). Rather than simply switching the determination level values, the determination level values may be switched according to, for example, a pattern of acceleration. The determination level values are switched by an acceleration-detection switching section configured by a circuit provided in the control section 10 and program control. Therefore, the acceleration detecting section 25 is electrically connected to the control section 10.

Note that, as a form of the acceleration detecting section 25, in the present embodiment, the acceleration detecting section 25 is configured by an IC (integrated circuit) or the like of one chip. However, the acceleration detecting section 25 is not limited to this form. For example, a configuration may be adopted in which the sensor section 14 and the acceleration determining section 15 are configured by separate members, electric connection is secured to enable the sensor section 14 and the acceleration determining section 15 to operate in cooperation with each other, and the sensor section 14 and the acceleration determining section 15 are controlled by software.

The communication section 26 is a component functioning as an interface configured to perform, for example, transmission and communication of sound data and the like between the recorder 1 and an external apparatus. As a specific form of the communication section 26, besides, for example, a communication circuit for wired connection such as a USB (universal serial bus), for example, a communication circuit for wireless connection such as Wi-Fi is applied.

The display section 27 is a constituent unit including a display panel that displays an actuation state and a setting state of the recorder 1 and displays a menu screen or the like for setting change and a driving circuit for the display panel. As the display section 27, for example, an LCD (liquid crystal display) is applied.

The clock section 28 is an integrated circuit having a function equivalent to an internal clock in a computer or the like a so-called real-time clock (RTC). The clock section 28 is a circuit section that adds date and time information to, for example, a sound data file and is utilized in a clocking counter, time control, and the like during control processing.

The power supply section 29 is a power supply source including, for example, a primary battery such as a dry cell or a secondary battery such as a rechargeable battery (hereinafter collectively abbreviated as battery and the like) and, for example, a circuit section that enables supply of electric power from the battery and the like and configured to supply a predetermined amount of electric power to each of the respective constituent units configuring the recorder 1 at appropriate predetermined timings. Note that the power supply section 29 may include, besides the battery and the like, an electric circuit including an AC adapter connectable to a general commercial power supply. The power supply section 29 may be configured in a form detachably attachable to the recorder 1. Note that, concerning other components of the recorder 1, illustration and detailed explanation of the components are omitted assuming that the components are the same as the components applied to the recorder and the like in the past.

Figure 2:
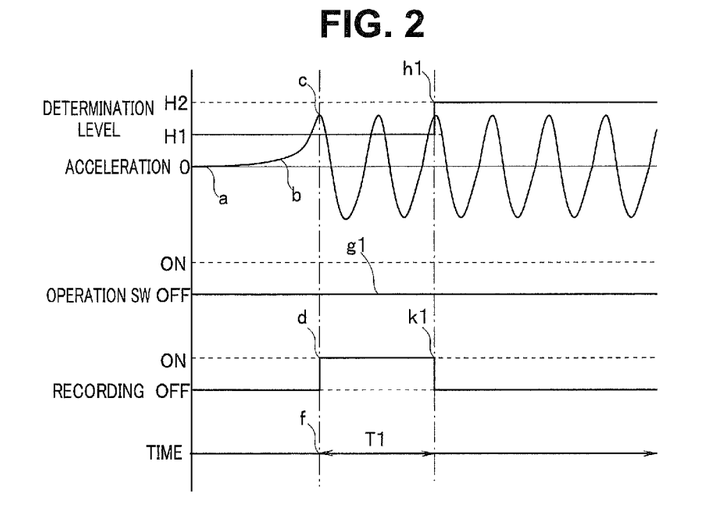
FIG. 2 is a diagram for explaining action of the mobile apparatus (a recorder) in the first embodiment of the present invention and is a timing chart assuming a situation in which a user is carrying the recorder.
Figure 3:
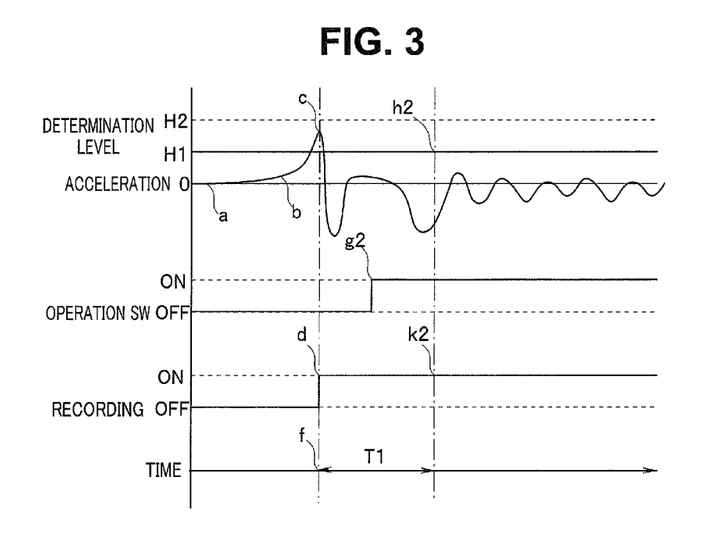
FIG. 3 is a diagram for explaining action of the mobile apparatus (the recorder) in the first embodiment of the present invention and is a timing chart assuming a situation in which the user lifts the recorder placed on a desk or the like and starts to use the recorder.
Figure 4:
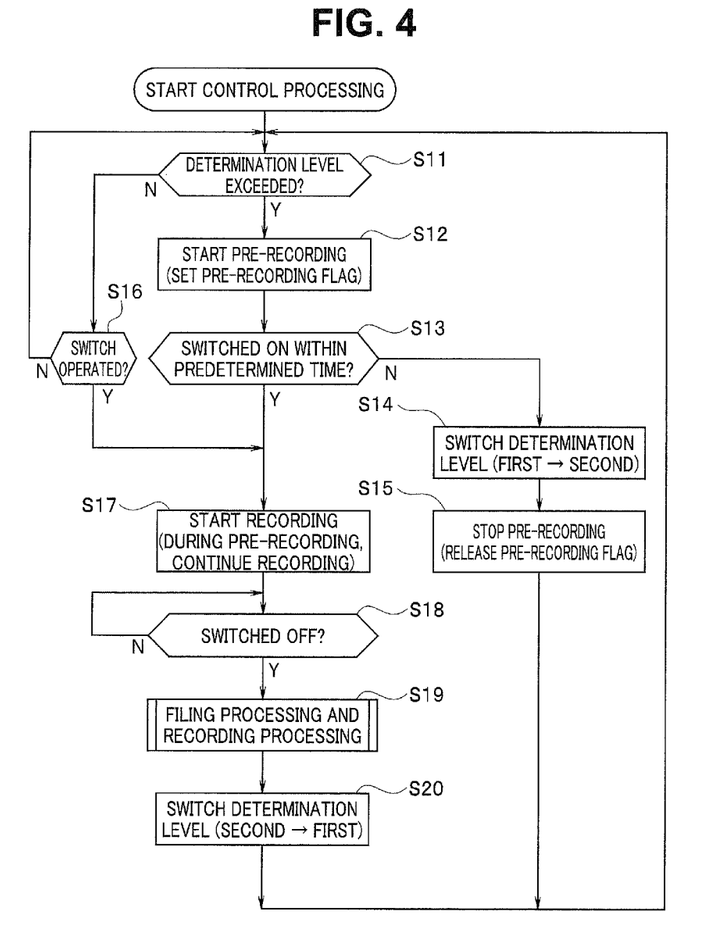
FIG. 4 is a flowchart showing a processing sequence of start control processing in the mobile apparatus (the recorder) in the first embodiment of the present invention.

Action in the recorder 1 in the present embodiment configured as explained above is explained below with reference to FIGS. 2 to 4. FIGS. 2 to 4 are diagrams for explaining the action of the recorder in the present embodiment. FIGS. 2 and 3 are timing charts assuming a situation in which the user uses the recorder. FIG. 2 is a timing chart assuming a situation in which the user carries the recorder. FIG. 3 is a timing chart assuming a situation in which the user lifts the recorder placed on a desk or the like and starts to use the recorder. FIG. 4 is a flowchart showing a processing sequence of start control processing in the recorder in the present embodiment. Note that the start control processing is processing including power feed control by the power-feed control section 13. The processing is simply abbreviated as start control processing in the following explanation.

The timing charts of FIGS. 2 and 3 mainly show various signals monitored in the control section 10, that is, an output (an acceleration value) from the sensor section 14 of the acceleration detecting section 25, an output (ON/OFF signals of an operation SW (e.g., a switch associated with the recording button)) from the operation section 22, and an output (recording actuation ON/OFF signals) of the recording control section 11. Note that, in FIGS. 2 and 3, a time axis is plotted on the horizontal axis.

First, the situation shown in the timing chart of FIG. 2 is simply explained. In this case, it is assumed that the recorder 1 in the present embodiment is placed on a desk or the like and is in a stationary state. At this point, an acceleration value detected in the sensor section 14 of the acceleration detecting section 25 is approximately zero (see a sign "a" in FIG. 2).

The recorder 1 is configured to start a recording actuation when the acceleration value detected in the sensor section 14 of the acceleration detecting section 25 exceeds a predetermined level. Therefore, a determination level value of acceleration is set in advance in the acceleration determining section 15 of the acceleration detecting section 25. In the present embodiment, as shown in FIG. 2, a first determination level value H1 is specified as an initial value of the acceleration determination level value. In the present embodiment, it is assumed that the acceleration determining section 15 has, besides the first determination level value H1, a second determination level value H2 larger (higher) than the first determination level value H1 (see FIG. 2; H1<H2).

The ON/OFF signals of the operation SW are ON/OFF signals from, for example, a switch member associated with the recording button (not shown in the figures in particular) for starting recording operation among the operation members included in the operation section 22. The recording button is an operation member operated by the user. The user operates the recording button, whereby an ON signal of the switch is generated.

Receiving the recording button ON signal, the control section 10 controls the recording control section 11 to execute recording processing. At this point, a recording actuation ON signal is generated from the recording control section 11 of the control section 10 (see FIG. 2). Note that the recording processing executed by the control section 10 refers to a series of processing for acquiring a sound signal (an analog signal) with the information input section 21, digitally converting the sound signal in the control section 10, and thereafter temporarily storing the sound signal in a temporary memory (not shown in the figures) provided in the control section 10 or separately from the control section 10. Such temporary recording processing is the same as the processing generally performed in the recorder and the like in the past.

As indicated by the sign "a" in the timing chart of FIG. 2, it is assumed that, when the recorder 1 is in the stationary state on the desk or the like (the sign "a" in FIG. 2), for example, the user holds and lifts the recorder 1. Then, an acceleration value detected in the sensor section 14 of the acceleration detecting section 25 changers (see a sign "b" in FIG. 2) and exceeds the first determination level value H1 soon (see a sign "c" in FIG. 2). Note that, in this case, it is assumed that, as a change in the acceleration value after the acceleration value exceeds the first determination level value H1, regular displacement continues as shown in FIG. 2.

Simultaneously with timing when the acceleration value detected by the sensor section 14 of the acceleration detecting section 25 exceeds the first determination level value H1, the control section 10 controls the recording control section 11 to start the temporary recording processing. Consequently, a recording actuation ON signal is generated (see a sign "d" in FIG. 2).

Simultaneously with the timing, the control section 10 starts timer count (clocking of a predetermined time period) referring to the clock section 28 (see a sign "f" in FIG. 2). The predetermined time period for performing the clocking is, for example, time period indicated by a sign T1 in FIG. 2.

During the predetermined time period T1, the control section 10 monitors a signal generated from the operation SW. In the example shown in FIG. 2, the case where an ON signal is not generated from the operation SW within time period of the predetermined time period T1 is shown (see a sign "g1" in FIG. 2).

When the ON signal is not generated from the operation SW within the time period of the predetermined time period T1 in this way, after the elapse of the predetermined time period T1, the control section 10 performs control for switching the determination level value in the acceleration determining section 15 of the acceleration detecting section 25 from the first determination level value H1 to the second determination level value H2 (see a sign "h1" in FIG. 2).

At the same time, (after the predetermined time period T1 elapses without the ON signal being generated from the operation SW within the time period of the predetermined time period T1), the control section 10 controls the recording control section 11 to drive the recording section 23 and stop the recording actuation. Consequently, a recording actuation OFF signal is generated (see a sign "k1" in FIG. 2).

In the example shown in FIG. 2, an acceleration value exceeding the first determination level value H1 is regularly continuously generated. As the displacement of the acceleration value of such a pattern, a situation is assumed in which, for example, the user is carrying the recorder 1. Under such a situation, when the determination level value of the acceleration determining section 15 of the acceleration detecting section 25 is the first determination level value H1, every time a detection result of the sensor section 14 exceeds the first determination level value H1, the recording actuation ON signal is generated and the recording actuation is started.

Therefore, when identifying the situation shown in FIG. 2 (i.e., a situation in which the recording actuation is started when the acceleration value exceeding the first determination level value H1 is detected from the situation of the stationary state of the acceleration value and, after acceleration is detected, an ON signal of the operation SW (the recording button, etc.) is not generated while the predetermined time period T1 elapses), the recorder 1 in the present embodiment switches the determination level value and disables the started recording actuation (stops the recording and discards acquired data) to thereby prevent a useless recording actuation from being started and prevent a wrong operation of a recording actuation.

The situation indicated by the timing chart of FIG. 3 is briefly explained. In this case as well, it is assumed that the recorder 1 in the present embodiment is placed on a desk or the like and is in a stationary state. At this point, an acceleration value detected in the sensor section 14 of the acceleration detecting section 25 is approximately zero (see a sign "a" in FIG. 3). In this case, it is assumed that, as an initial value of the acceleration determination level value, the first determination level value H1 is specified.

First, when the recorder 1 is in the stationary state on the desk or the like (the sign "a" in FIG. 3), as in the situation shown in FIG. 2, it is assumed that the user holds and lifts the recorder 1. Then, acceleration value detected in the sensor section 14 of the acceleration detecting section 25 changes (see a sign "b" in FIG. 3) and exceeds the first determination level value H1 soon (see a sign "c" in FIG. 3). Note that it is assumed that a change in the acceleration value after the acceleration value exceeds the first determination level value H1 is displacement shown in FIG. 3.

Simultaneously with timing when the acceleration value detected in the sensor section 14 of the acceleration detecting section 25 exceeds the first determination level value H1, as in the situation shown in FIG. 2, the control section 10 controls the recording control section 11 to start the temporary recording processing. Consequently, a recording actuation ON signal is generated (see a sign "d" in FIG. 3).

Simultaneously with the timing, the control section 10 starts timer count (clocking of a predetermined time period) referring to the clock section 28 (see a sign "f" in FIG. 3). The predetermined time period for performing the clocking is, for example, time period indicated by a sign T1 in FIG. 3.

During the predetermined time period T1, the control section 10 monitors a signal generated from the operation SW. In the example shown in FIG. 3, an ON signal is generated from the operation SW within time period of the predetermined time period T1 (see a sign "g2" in FIG. 3).

When the ON signal is generated from the operation SW within the time period of the predetermined time period T1 in this way, the control section 10 maintains the first determination level value H1 even after the elapse of the predetermined time period T1 (see a sign "h2" in FIG. 3).

At the same time, the control section 10 controls the recording control section 11 to continue the temporary recording processing and continue the recording actuation. Therefore, the recording actuation ON signal is also continuously generated (see a sign "k2" in FIG. 3).

In the example shown in FIG. 3, it is assumed that, after the acceleration value exceeding the first determination level value H1 is generated, the acceleration value transitions within the range of the first determination level value H1. As the displacement of the acceleration value of such a pattern, a situation is assumed in which, for example, the user lifts the recorder 1 and thereafter holds and uses the recorder 1. Therefore, when identifying the situation shown in FIG. 3 (i.e., a situation in which the recording actuation is started when the acceleration value exceeding the first determination level value H1 is detected from the situation of the stationary state of the acceleration value and, after acceleration is detected, an ON signal of the operation SW (the recording button, etc.) is confirmed while the predetermined time period T1 elapses), the recorder 1 in the present embodiment performs control to continue the recording actuation already being executed. Consequently, it is possible to execute a sure recording actuation. Therefore, it is possible to constantly acquire a desired recording result for sure (sound data).

A processing sequence of start control processing corresponding to the series of situations explained with reference to FIGS. 2 and 3 is explained below with reference to FIG. 4.

First, it is assumed that the recorder 1 in the present embodiment is placed on a desk or the like and is in a stationary state. At this point, it is assumed that the recorder 1 is not completely in a power-off state and is in a state so-called sleep state or the like in which a part of functions of the control section 10 is in a power-on state. Note that the sleep state is a state in which power supply from the power supply section 29 to the respective constituent units is substantially stopped but power supply to a part of the constituent units including the power-feed control section 13 and the acceleration detecting section 25 is continuously performed. Such a sleep state is realized by power feed control by the power-feed control section 13. The power feed control concerning the sleep state is the control processing generally performed in an electronic apparatus in the past. Therefore, detailed explanation of the power feed control is omitted.

In this state, first, in step S11 in FIG. 4, the control section 10 monitors an output (an acceleration value) from the sensor section 14 of the acceleration detecting section 25. When confirming that the acceleration value exceeds a set determination level value (an initial value; the first determination level value H1), the control section 10 proceeds to processing in step S12. When the acceleration value does not exceed the set determination level value (the initial value; the first determination level value H1), the control section 10 proceeds to processing in step S16.

In step S16, the control section 10 monitors an output signal generated from the operation section 22 via the state identifying section 12. When confirming switch operation (e.g., receiving generation of a recording button ON signal from the switch member associated with the recording button (not shown in the figures)), the control section 10 proceeds to processing in step S17. When not confirming switch operation, the control section 10 returns to the processing in step S11.

On the other hand, when confirming in the processing in step S11 that the acceleration value exceeds the determination level value (the initial value; the first determination level value H1) and proceeding to the processing in step S12, in step S12, the control section 10 controls the recording control section 11 to start pre-recording processing and sets a pre-recording flag. Note that the pre-recording processing is processing for temporarily storing digital sound data acquired by the information input section 21 in the temporary memory (not shown in the figures). That is, the pre-recording processing is processing equivalent to the temporary recording processing explained above.

At the same time, the control section 10 starts timer count (clocking of a predetermined time period) referring to the clock section 28. Thereafter, the control section 10 proceeds to processing in step S13.

Subsequently, in step S13, the control section 10 monitors the operation section 22 via the state identifying section 12 and checks whether switch-on operation of the recording button (the operation SW) is performed before the predetermined time period T1 elapses. When confirming the ON actuation of the operation SW within the predetermined time period T1, the control section 10 proceeds to processing in step S17. When not confirming the ON actuation of the operation SW within the predetermined time period T1 (see the illustration in FIG. 2), the control section 10 proceeds to processing in step S14.

In step S14, the control section 10 controls the acceleration determining section 15 of the acceleration detecting section 25 and performs switching of the acceleration determination level value. When the set acceleration determination level value is, for example, the first determination level value H1, which is the initial value, the control section 10 switches the acceleration determination level value to the second determination level value H2.

Consequently, it is possible to prevent pre-recording (which is sometimes undesirable in terms of energy saving and a required memory capacity) from immediately starting at acceleration. In this way, the control section 10 includes the acceleration-detection switching section that changes the form of the acceleration detection of the acceleration detecting section (changes a method of determination of the acceleration determining section 15 in the acceleration detecting section 25 in the control section 10). The power-feed control section performs the switching control of the acceleration-detection switching section when the state identifying section does not identify switch operation after the acceleration detecting section detects acceleration. It is possible to provide an apparatus excellent in terms of energy saving and a memory (recording) capacity. Thereafter, the control section 10 proceeds to processing in step S15.

Subsequently, in step S15, the control section 10 controls the recording control section 11 to stop the pre-recording processing being executed and releases the pre-recording flag. At this point, the control section 10 also performs processing for discarding the acquired data temporarily stored in the temporary memory (not shown in the figures), that is, processing for clearing the temporary memory. Thereafter, the control section 10 returns to the processing in step S11.

Note that, when the control section 10 returns to the processing in step S11 in this way, the set acceleration determination level value is the second determination level value H2. Therefore, in the processing in step S11 in the second round, the control section 10 determines whether the acceleration determination level value exceeds the second determination level value H2.

Subsequently, when confirming the ON actuation of the operation WS (the recording button ON signal) within the predetermined time period in the processing in step S13 or when confirming the switch operation (the recording button ON signal) in the processing in step S16, as explained above, when proceeding to the processing in step S17, in step S17, the control section 10 controls the recording control section 11 to start the temporary recording processing. Note that, when the pre-recording is already performed at this point in time, the control section 10 controls the recording control section 11 to continue the pre-recording processing.

Subsequently, in step S18, the control section 10 monitors the operation section 22 via the state identifying section 12 and checks whether switch-off operation of the recording button is performed. When confirming a switch-off signal of the recording button, the control section 10 proceeds to processing in a next step S19. When not confirming the switch-off signal of the recording button, the control section 10 repeats the processing in step S18. That is, the temporary recording (the pre-recording processing) is continuously executed until the switch-off signal of the recording button is confirmed.

When confirming the switch-off signal of the recording button and proceeding to the processing in step S19, in step S19, the control section 10 controls the recording control section 11 to execute filing processing and controls the recording section 23 via the recording control section 11 to execute recording processing. Consequently, an acquired and generated sound data file is stored and saved in a predetermined storage region of the recording section 23.

Figure 5:
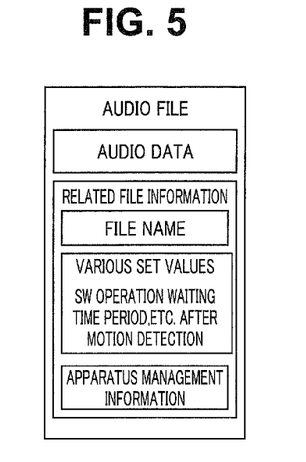
FIG. 5 is a conceptual diagram showing an internal data structure of a sound data file treated in the mobile apparatus (the recorder) in the first embodiment of the present invention.

An overview of an internal structure of the sound data file stored and saved in the predetermined storage region of the recording section 23 is explained below mainly with reference to FIG. 5. FIG. 5 is a conceptual diagram showing a data structure of a sound data file treated in the recorder in the present embodiment.

The sound data file treated in the recorder 1 in the present embodiment is mainly configured by a sound data, which is a subject, and related file information related to the sound data. The related file information includes, for example, apparatus management information besides a file name and various kinds of setting value information. The various kinds of setting value information include, for example, information such as a switch operation waiting time period (time period equivalent to the predetermined time period T1) after the acceleration detection. The apparatus management information includes, for example, apparatus information (a model name of an apparatus, etc.) of a recorder or the like in which recording processing is performed and information (names, version information, etc.) concerning used application software for noise processing, filter processing, falsification prevention, and the like. Since the recorder 1 includes such information, it is easy to perform a file search using these kinds of information. A method of using the apparatus during sound recording, which is not clearly explained by only sound, is recorded. These kinds of information can be used when the sound is listened or arranged. It is possible analyze whether sound is lost because of missing of a leading portion or the head of sound is lost because of an operation mistake or an intention. Consequently, it is possible to determine whether sound should be supplemented and listened. Note that the sound file is explained here according to an example in which a recording apparatus is assumed. However, if the sound recording section is replaced with an image recording section, the explanation can be directly applied to an image file.

Referring back to FIG. 4, in step S20, the control section 10 controls the acceleration determining section 15 of the acceleration detecting section 25 to perform switching of an acceleration determination level value. When a currently set acceleration determination level value is, for example, the second determination level value H2, the control section 10 switches the acceleration determination level value to the first determination level value H1. Thereafter, the control section 10 returns to the processing in step S11 and repeats the processing in the subsequent steps.

As explained above, according to the first embodiment, the recorder 1, which is a mobile apparatus, which is a portable and small electronic apparatus, configured to be able to be freely carried by a user and easily usable in a place to where the mobile apparatus is carried, starts the recording actuation when detecting an acceleration value exceeding the first determination level value H1 from a situation in which the acceleration value is in the stationary state, and, after the acceleration detection, when identifying a situation without the ON signal of the operation SW (the recording button, etc.) while the predetermined time period T1 elapses, switches the determination level value to the second determination level value H2 higher (larger) than the first determination level value H1 (H1<H2) and disables the started recording actuation (stop the recording and discard acquired data). Consequently, it is possible to prevent a useless recording actuation from being started and prevent a wrong actuation of the recording actuation (see FIG. 2). Therefore, it is possible to reduce electric power consumed by an unnecessary recording actuation and thereby contribute to power saving.

On the other hand, when detecting an acceleration value exceeding the first determination level value H1 from a situation in which the acceleration value is in the stationary state, the recorder 1 starts the recording actuation and, after the acceleration detection, when identifying a situation in which the ON signal of the operation WS (the recording button, etc.) is confirmed while the predetermined time period T1 elapses, performs control for continuing the recording actuation already being executed. Consequently, it is possible to execute a sure recording actuation (see FIG. 3). Therefore, it is possible to always surely acquire a desired recording result (sound data).

Second Embodiment

A second embodiment of the present invention is explained below with reference to FIGS. 6 and 7. In the present embodiment, as in the first embodiment, a recorder is explained as an example of a mobile apparatus applied with the present invention.

A basic configuration in the present embodiment is the same as the basic configuration in the first embodiment. Only a control method in the present embodiment is slightly different. Therefore, concerning components of the recorder, components same as the components in the first embodiment are denoted by the same reference numerals and signs. Only different portions are explained below.

Figure 6:
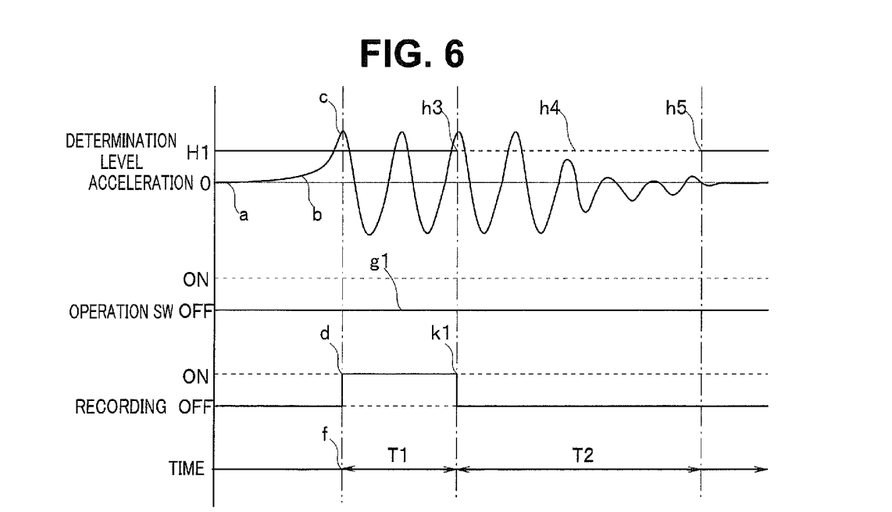
FIG. 6 is a diagram for explaining action of a mobile apparatus (a recorder) in a second embodiment of the present invention and is a timing chart assuming a situation in which a user is carrying the recorder.
Figure 7:
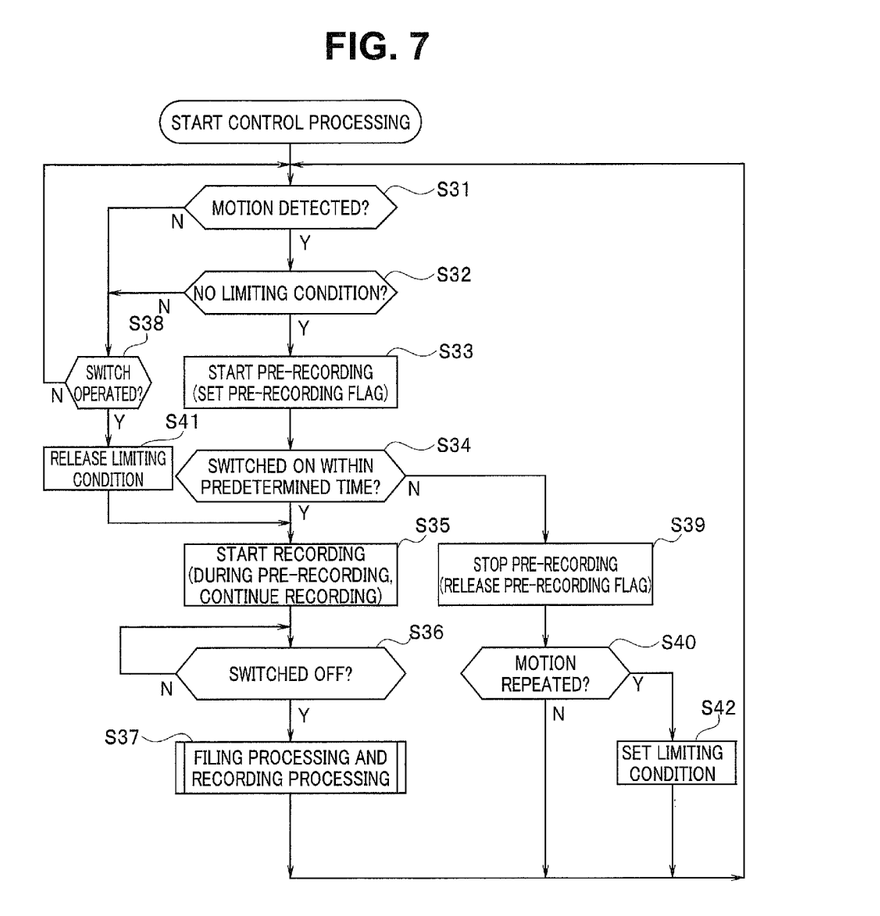
FIG. 7 is a flowchart showing a processing sequence of start control processing in the mobile apparatus (the recorder) in the second embodiment of the present invention.

FIGS. 6 and 7 are diagrams for explaining action of the recorder in the present embodiment. FIG. 6 is a timing chart assuming a situation in which a user is carrying the recorder (corresponding to the situation shown in FIG. 2). FIG. 7 is a flowchart showing a processing sequence of start control processing in the recorder in the present embodiment.

In the timing chart of FIG. 6, as in FIGS. 2 and 3, various signals monitored in the control section 10, that is, an output (an acceleration value) from the sensor section 14 of the acceleration detecting section 25, an output (ON/OFF signals of an operation SW) from the operation section 22, and an output (recording actuation ON/OFF signals) of the recording control section 11 are mainly shown. In FIG. 6, a time axis is plotted on the horizontal axis.

A situation indicated by the timing chart of FIG. 6 is as explained below. First, it is assumed that the recorder 1 is placed on a desk or the like and is in a stationary state. At this point, an acceleration value detected in the sensor section 14 of the acceleration detecting section 25 is approximately zero (see a sign "a" in FIG. 6).

As in the first embodiment, the recorder 1 is configured such that a recording actuation is started when an acceleration value detected in the sensor section 14 of the acceleration detecting section 25 exceeds a predetermined level. Therefore, a determination level value of acceleration is set in advance in the acceleration determining section 15 of the acceleration detecting section 25. In the present embodiment, as shown in FIG. 6, the first determination level value H1 is specified as an initial value of the acceleration determination level value.

As indicated by the sign "a" in the timing chart of FIG. 6, it is assumed that, when the recorder 1 is in the stationary state on the desk or the like (the sign "a" in FIG. 6), for example, the user holds and lifts the recorder 1. Then, an acceleration value detected in the sensor section 14 of the acceleration detecting section 25 changes (see a sign "b" in FIG. 6) and exceeds the first determination level value H1 soon (see a sign "c" in FIG. 6). In this case, it is assumed that, a change in the acceleration value after the acceleration value exceeds the first determination level value H1 is displacement shown in FIG. 6.

Simultaneously with timing when the acceleration value detected by the sensor section 14 of the acceleration detecting section 25 exceeds the first determination level value H1, the control section 10 controls the recording control section 11 to start the temporary recording processing. Consequently, a recording actuation ON signal is generated (see a sign "d" in FIG. 6).

Simultaneously with the timing, the control section 10 starts timer count (clocking of a predetermined time period) referring to the clock section 28 (see a sign "f1" in FIG. 6). The predetermined time period for performing the clocking is, for example, time period indicated by a sign T1 in FIG. 6.

During the predetermined time period T1, the control section 10 monitors a signal generated from the operation SW. In the example shown in FIG. 6, an ON signal is not generated from the operation SW within time period of the predetermined time period T1 (see a sign "g1" in FIG. 6).

When the ON signal is not generated from the operation SW within the time period of the predetermined time period T1 in this way, after the elapse of the predetermined time period T1, the control section 10 performs control for temporarily stopping the determination processing by the acceleration determining section 15 of the acceleration detecting section 25 (see a sign "h3" in FIG. 6).

At the same time, (after the predetermined time period T1 elapses without the ON signal being generated from the operation SW within the time period of the predetermined time period T1), the control section 10 controls the recording control section 11 to stop the temporary recording processing. Consequently, a recording actuation OFF signal is generated (see a sign "k1" in FIG. 6).

In the example shown in FIG. 6, the displacement of the acceleration shows a change in which the displacement is gradually attenuated and approaches zero. As the displacement of the acceleration value of such a pattern, a situation is assumed in which, for example, the user lifts the recorder 1 and thereafter starts walking in a state in which the recorder 1 is stored in a bag or the like.

Therefore, the recorder 1 in the present embodiment performs control to, under such a situation, stop the acceleration determination processing by the acceleration determining section 15 of the acceleration detecting section 25 (see a sign "h4" in FIG. 6) during a predetermined time period (time period T2 in the example shown in FIG. 6) until the acceleration displacement stops after the elapse of the predetermined time period T1 (see a sign "h3" in FIG. 6) and resume the acceleration determination processing by the acceleration determining section 15 of the acceleration detecting section 25 at timing (see a sign "h5" in FIG. 6) when the acceleration displacement stops.

Therefore, when identifying the situation shown in FIG. 6 (i.e., the situation in which, after the acceleration value exceeding the predetermined determination level (in the present embodiment, the first determination level value H1) is detected from the situation in which the acceleration value is in the stationary state, no ON signal of the operation SW exists within the predetermined time period T1 and the acceleration displacement stops in the predetermined time period T2 after the elapse of the predetermined time period T1), the recorder 1 in the present embodiment temporarily stops the acceleration determination processing during the predetermined time period T2, that is, until the acceleration displacement stops after the elapse of the predetermined time period T1, to thereby prevent a useless recording actuation from starting and prevent a wrong actuation of the recording actuation.

A processing sequence of the start control processing corresponding to the series of situations explained with reference to FIG. 6 is explained below with reference to FIG. 7.

First, it is assumed that the recorder 1 in the present embodiment is placed on a desk or the like and is in a stationary state. At this point, as in the first embodiment, the recorder 1 is in a so-called sleep state.

In this state, first, in step S31 in FIG. 7, the control section 10 monitors an output (an acceleration value) from the sensor section 14 of the acceleration detecting section 25. By monitoring the output, the control section 10 checks whether a motion (acceleration) of the recorder 1 is detected. When confirming that a motion (acceleration) is detected and exceeds the set determination level value (the first determination level value H1), the control section 10 proceeds to processing in step S32. When a motion (acceleration) is not detected, the control section 10 proceeds to processing in step S38.

In step S32, the control section 10 checks whether a predetermined limiting condition is set.

In the present embodiment, assuming a situation in which a motion (acceleration) in a predetermined level is repeatedly generated as a result of the motion (acceleration) detection processing, the recorder 1 is configured to temporarily stop the motion (acceleration) detection processing under such a situation. Therefore, the predetermined limiting condition is set. The predetermined limiting condition is a predetermined condition for limiting motion (acceleration) detection processing. For example, as explained above, a situation is conceivable in which continuous motion (acceleration) equal to or higher than a predetermined level occurs.

Pre-recording started by such continuous motion occurrence is sometimes undesirable in terms of energy saving and a necessary memory capacity. However, it is possible to prevent the pre-recording according to limiting condition. Presence or absence of such limitation can also be represented as provision of an acceleration-detection switching section that changes a form of acceleration detection of the acceleration detecting section. In the control section 10, a method of determination of the acceleration determining section 15 of the acceleration detecting section 25 with less consumed energy is changed to prevent the control section 10 from always determining acceleration to consume energy.

When the state identifying section does not identify switch operation after the acceleration detecting section detects the acceleration, as explained above, the power-feed control section, so to speak, functions as an apparatus that performs switching control of the acceleration-detection switching section. It is possible to provide an apparatus excellent in terms of energy saving and a memory (recording) capacity.

In this case, when the limiting condition is already set, the control section 10 proceeds to processing in step S38. When the limiting condition is not set (in the case of no limiting condition; including an initial state), the control section 10 proceeds to processing in step S33.

In step S33, the control section 10 controls the recording control section 11 to start pre-recording processing and set a pre-recording flag. At the same time, the control section 10 starts timer count (clocking of a predetermined time period) referring to the clock section 28. Thereafter, the control section 10 proceeds to processing in step S34.

In step S34, the control section 10 monitors the operation section 22 via the state identifying section 12 and checks whether switch-on operation of the recording button (the operation SW) is performed before the predetermined time period T1 elapses. When confirming the ON actuation of the operation SW within the predetermined time period T1, the control section 10 proceeds to processing in step S35. When not confirming the ON actuation of the operation SW within the predetermined time period T1 (see the illustration in FIG. 6), the control section 10 proceeds to processing in step S39.

In step S35, the control section 10 controls the recording control section 11 to start temporary recording processing. Note that, when the pre-recording processing is already performed at this point in time, the control section 10 causes the recording control section 11 to continue the pre-recording processing.

Subsequently, in step S36, the control section 10 monitors the operation section 22 via the state identifying section 12 and checks whether switch-off operation of the recording button is performed. When confirming a switch-off signal of the recording button, the control section 10 proceeds to processing in a next step S37. When not confirming the switch-off signal of the recording button, the control section 10 repeats the processing in step S36. That is, the temporary recording processing (the pre-recording processing) is continuously executed until the switch-off signal of the recording button is confirmed. Note that the switch-off operation checked in the processing in step S36 is not limited to the switch-off operation of the recording button and may be OFF operation of other operation members such as a power button.

When confirming the switch-off signal of the recording button and proceeding to the processing in step S37, in step S37, the control section 10 controls the recording control section 11 to execute filing processing and controls the recording section 23 via the recording control section 11 to execute recording processing. Consequently, an acquired and generated sound data file is stored and saved in a predetermined storage region of the recording section 23. Note that an internal structure of the sound data file stored and saved in the recording section 23 is the same as the internal structure in the first embodiment. Thereafter, the control section 10 returns to the processing in step S31 and repeats the subsequent processing.

On the other hand, when not confirming the switch operation in the processing in step S34 and proceeding to the processing in step S39, in step S39, the control section 10 controls the recording control section 11 to stop the pre-recording processing being executed and release the pre-recording flag. At this point, the control section 10 also performs processing for discarding the acquired data temporarily stored in the temporary member (not shown in the figures), that is, clear processing for the temporary memory. Thereafter, the control section 10 proceeds to processing in step S40.

In step S40, the control section 10 monitors an output (an acceleration value) from the sensor section 14 of the acceleration detecting section 25. That is, the control section 10 checks whether a motion (acceleration) is repeatedly performed. In a situation in which the motion is repeated (when acceleration exceeding the first determination level value H1 is repeatedly detected), the control section 10 proceeds to processing in step S42. In a situation in which the motion is not repeated, the control section 10 returns to processing in step S31.

Note that, as the situation in which the acceleration is gradually attenuated and stops soon, a situation is assumed in which, for example, while the predetermined time period T2 elapses, the acceleration value detected by the sensor section 14 of the acceleration detecting section 25 transitions while maintaining at least a value equal to or smaller than the first determination level value or a situation is assumed in which the acceleration value continues to be a value close to zero continues.

In step S42, the control section 10 performs processing for setting a limiting condition for the acceleration determining section 15 of the acceleration detecting section 25. Consequently, the acceleration determining section 15 stops the execution of motion (acceleration) detection processing until the limiting condition is released. Thereafter, the control section 10 returns to the processing in step S31.

Note that, when the motion detection is not performed in the processing in step S31 or when confirming in the processing in step S32 that the limiting condition is already set and proceeding to the processing in step S38, in step S38, the control section 10 monitors an output signal from the operation section 22 via the state identifying section 12. When confirming the switch operation (e.g., receiving generation of a recording button ON signal from the switch member associated with the recording button (not shown in the figures)), the control section 10 proceeds to step S41. In step S41, the control section 10 performs processing for releasing the limiting condition if the limiting condition is set for the acceleration determining section 15 of the acceleration detecting section 25. Thereafter, the control section 10 proceeds to processing in step S35. When not confirming the switch operation, the control section 10 returns to the processing in step S31. That is, the processing in step S38 is general actuation processing in the recorder 1 for receiving operation of the recording button by the user and starting the recording actuation.

As explained above, according to the second embodiment, the recorder 1, which is a mobile apparatus, which is a portable and small electronic apparatus, configured to be able to be freely carried by a user and easily usable in a place to where the mobile apparatus is carried, is able to start the recording actuation when detecting an acceleration value exceeding the predetermined determination level value (e.g., the first determination level value H1) from a situation in which the acceleration value is in the stationary state, and, after the acceleration detection, when identifying a situation without the ON signal of the operation SW (the recording button, etc.) while the predetermined time period T1 elapses and a situation in which a motion is repeated, by temporarily stopping the acceleration determination processing, it is possible to prevent a start of a useless recording operation and prevent a wrong operation of the recording operation. Therefore, it is possible to reduce electric power consumption while the acceleration determination processing is temporarily stopped. Therefore, it is possible to contribute to power saving.

Note that, in the respective embodiments explained above, the recorder is illustrated as an example of the mobile apparatus, the recording function of the recorder is focused on, and the specific example concerning the power feed control and the start control for recording action is explained. However, the present invention is not limited to this. For example, as an example of the mobile apparatus, in the case of an image pickup apparatus including an image pickup function, it is also possible to focus on an image pickup function for a still image and a movie and apply the present invention to power feed control and start control for image pickup action. Further, besides, in mobile apparatuses other than the recorder and the image pickup apparatus such as information apparatuses and sensors that should instantaneously acquire information concerning a target object, it is also possible to apply the present invention in power feed control and start control for action corresponding to each of the respective apparatuses. In an information acquiring apparatus, a hand-held operation section is integrated. However, it is possible to use the present invention when the operation section and the information acquiring apparatus are separated. It is possible universally use the present invention in uses in which an apparatus including a hand-held operation section and takes long to start is quickly moved. It is also possible to apply the present invention to a microphone and the like.

In the respective processing sequences explained in the respective embodiments, a change of the procedures can be allowed as long as the change is not against the characteristics of the processing sequences. Therefore, in the processing sequences, for example, the execution order of the respective processing steps may be changed, a plurality of processing steps may be simultaneously executed, and, every time the series of processing sequences is executed, the order of the respective processing steps may be differentiated. That is, even if actuation flows in claims, the specification, and the drawings are explained using "first", "subsequently", and the like for convenience, this does not mean that it is essential to carry out the actuation flows in this order. It goes without saying that respective steps forming the actuation flows can also be omitted as appropriate concerning portions that do not affect the essence of the invention.

As explained above, according to the present invention, measures are taken against an actuation timing delay from a power feed start, which is a problem in the configuration in which, after the acceleration detection, the state identification by the state identifying section such as the photointerrupter is performed to perform control of power feed in the example in the past. In the apparatus in which the battery is used as the main power supply source, even a consumed current of the photointerrupter and the like is undesirable in terms of energy saving. However, according to the invention of this application, in the mobile apparatus in the past, since the originally necessary switch member is used as it is, special component implementation is unnecessary, cost is reduced, a space is saved, and an energy saving property is excellent.

Among the techniques explained above, most of the control and the functions mainly explained in the flowcharts often can be set by a software program. A computer can realize the control and the functions by reading and executing the software program. The software program is electronic data, all or a part of which is stored or recorded as a computer program product in a product manufacturing process in advance, in the storage medium, the storing section, and the like, more specifically, for example, portable media such as a flexible disk, a CD-ROM, and a nonvolatile memory and storage media such as a hard disk and a volatile memory. Besides, the software program can be circulated or provided at the time of product shipment or via a portable medium or a communication line. Even after the product shipment, a user can download and install the software program in a computer via a communication network, the Internet, or the like by himself or herself or install the software program in the computer from a storage medium to enable the software program to operate. Consequently, it is possible to easily realize the image pickup apparatus in the present embodiment.

Note that the present invention is not limited to the embodiments explained above. It goes without saying that various modifications and applications can be implemented within a range not departing from the spirit of the invention. Further, inventions in various stages are included in the embodiments. Various inventions can be extracted according to appropriate combinations in a disclosed plurality of constituent elements. For example, when the problems to be solved by the invention can be solved and the effects of the invention can be obtained even if several constituent elements are deleted from all the constituent elements described in the one embodiment, a configuration from which the constituent elements are deleted can be extracted as an invention. Further, the constituents described in the different embodiments may be combined as appropriate. The present invention is not limited by specific implementation forms of the present invention except that the present invention is limited by the appended claims.

The present invention is not limited to a mobile terminal, which is a portable electronic apparatus specialized for a recording function such as the recorder (i.e., the digital voice recorder) illustrated in the respective embodiments. The present invention can be widely applied to mobile apparatuses of other forms, for example, mobile apparatuses, which are various portable electronic apparatuses such as a cellular phone, a smartphone, an electronic notebook, an electronic dictionary, a portable information terminal, a personal computer, a tablet terminal apparatus, a game apparatus, a television, a clock, a navigation apparatus that makes use of a GPS (global positioning system), a digital camera, and a movie camera.

What is claimed is:

1. A mobile apparatus that reduces an amount of energy consumed by the mobile apparatus comprising:
   a sensor that detects an acceleration of the mobile apparatus;
   a power supply;
   a recorder; and
   a control circuit that is communicatively coupled to the sensor, the power supply and the recorder, wherein the control circuit communicates with the sensor to determine whether the mobile apparatus has been moved;
   wherein when it is determined that the mobile apparatus is moved, the control circuit:
      controls the power supply to supply a power feed to the recorder,
      stores, in a memory, data acquired by the recorder,
      identifies whether a state of a switch is in an on-state,
      controls the power supply to continue to supply the power feed to the recorder when the switch is identified to be in the on-state, and
      controls the power supply to stop supplying the power feed to the recorder when the switch is identified to not be in the on-state within a pre-determined period after the mobile apparatus is moved.

2. The mobile apparatus according to claim 1, wherein the control circuit further:
   controls the power supply to stop the power feed when the acceleration exceeds a first determination level value.

3. The mobile apparatus according to claim 2, wherein, when the control circuit further switches the first determination level value of the acceleration determining section to a second determination level value larger than the first determination level value when the acceleration exceeds the first determination level value.

4. The mobile apparatus according to claim 3, wherein the control circuit further switches the second determination level value to the first determination level value when the state of the switch is identified to be in the on-state.

5. The mobile apparatus according to claim 2, wherein the control circuit controls the power supply to stop powering the sensor for a second predetermined time period when the switch is not identified to be in the on-state within the pre-determined period.

6. The mobile apparatus according to claim 5, wherein the predetermined time period is a time period in which the acceleration value detected transitions at a value at least equal to or smaller than the first determination level value.

7. A power feed control method that reduces an amount of energy consumed by a mobile apparatus comprising:
   detecting, using a sensor, an acceleration of the mobile apparatus;
   determining, by a control circuit, whether the acceleration exceeds a first determination level value; and
   when it is determined that the acceleration exceed the first determination level value, the control circuit:
      controls a power supply to supply a power feed to a recorder,
      stores data acquired by the recorder in a memory
      identifies whether a state of a switch is in an on-state,
      controls the power supply to continue to supply the power feed to the recorder when the switch is identified to be in the on-state; and
      controls the power supply to stop supplying the power feed to the recorder when the switch is not identified to be in the on-state within a pre-determined period after the mobile apparatus is moved.

8. The mobile apparatus according to claim 1, wherein the recorder is a digital voice recorder.

9. The mobile apparatus according to claim 1, wherein the recorder is an image pickup device.

10. The mobile apparatus according to claim 1, wherein the control circuit further deletes the data required by the recorder from the memory when the switch is not identified to be in the on-state within the pre-determined period.

11. The power feed control method according to claim 7, wherein the control circuit switches further the first determination level value to a second determination level value larger than the first determination level value when the acceleration exceeds the first determination level value.

12. The power feed control method according to claim 7, wherein the control circuit controls the power supply to stop powering the sensor for a second predetermined time period when the state of the switch is not identified to be in the on-state within the pre-determined period.

13. A mobile apparatus that reduces an amount of energy consumed by the mobile apparatus comprising:
- a sensor that detects an acceleration of the mobile apparatus;
- a recorder that records data;
- a power supply; and
- a control circuit that is communicatively coupled to the sensor, the power supply and the recorder, wherein the control circuit controls the power supply to supply a power feed to the recorder and determines whether the mobile apparatus has been moved based on the acceleration detected by the sensor, wherein when it is determined that the mobile apparatus is moved, the control circuit:
- stores, in a memory, the data recorded by the recorder,
- identifies whether the mobile apparatus is in a recording mode;
- continues to store the recorded data in the memory when the mobile device is identified to be in the recording mode, and
- stops storing the recorded data in the memory when the mobile device is not identified to be in the recording mode within a pre-determined period after the mobile apparatus is moved.

14. The mobile apparatus according to claim 13, wherein, the control circuit deletes the recorded data from the memory when the state of the mobile device is not identified to be in the recording mode within the pre-determined period. the data.

15. The mobile apparatus according to claim 13, wherein the memory further stores at least one of information concerning time when the acceleration was detected and a time when the mobile device was identified to be in the recording mode.

* * * * *